US006022453A

United States Patent [19]
Weber

[11] Patent Number: 6,022,453
[45] Date of Patent: Feb. 8, 2000

[54] APPARATUS FOR THE DISTILLATION OF OIL-SEED EXTRACTS

[75] Inventor: Klaus Weber, Hamburg, Germany

[73] Assignee: Fried. Krupp AG Hoesch Krupp, Essen, Germany

[21] Appl. No.: 09/130,424

[22] Filed: Aug. 6, 1998

[30] Foreign Application Priority Data

Sep. 5, 1997 [GB] United Kingdom .............. 197 38 927

[51] Int. Cl.[7] .................................. B01D 3/00; C11B 1/10
[52] U.S. Cl. ........................... 202/173; 159/46; 159/47.1; 159/DIG. 8; 202/154; 202/155; 202/176; 202/182; 202/186; 203/71; 203/87; 426/430; 554/12
[58] Field of Search ..................................... 202/154–155, 202/168–169, 170, 173, 182, 186, 176; 203/21, 27, 22, 71, 87, 43, DIG. 8; 159/47.1, 46, DIG. 8; 554/8–9, 12, 20; 426/425, 430, 475, 489, 495

[56] References Cited

U.S. PATENT DOCUMENTS

| | | | |
|---|---|---|---|
| 2,567,179 | 9/1951 | Bonotto | 554/15 |
| 2,790,708 | 4/1957 | Karnofsky | 554/16 |
| 3,392,455 | 7/1968 | Kingsbaker, Jr. et al. | 159/17.3 |
| 3,970,764 | 7/1976 | Karnofsky | 426/430 |
| 3,993,535 | 11/1976 | Karnofsky | 159/47.1 |
| 5,620,728 | 4/1997 | Langley et al. | 426/430 |

FOREIGN PATENT DOCUMENTS

| | | |
|---|---|---|
| 0290156 | 11/1988 | European Pat. Off. . |
| 23 48 734 | 4/1975 | Germany . |
| 27 52 585 | 7/1978 | Germany . |
| 35 38 745 | 5/1987 | Germany . |
| 37 19 504 | 12/1988 | Germany . |
| 0199349 | 10/1985 | Japan . |
| 7107939 | 4/1995 | Japan . |

Primary Examiner—Virginia Manoharan
Attorney, Agent, or Firm—Herbert Dubno

[57] ABSTRACT

A compact apparatus of the distillation of solvent from a mixture of the solvent with oil seed for the extraction thereof according to the invention, the primary module includes a vapor scrubber forming a vapor contactor, a main evaporator and a first condenser while the secondary module has an after evaporator combined in a unit with the stripping column and the second condenser.

9 Claims, 2 Drawing Sheets

APPARATUS FOR THE DISTILLATION OF OIL-SEED EXTRACTS

FIELD OF THE INVENTION

My present invention relates to an apparatus for the distillation of solvent containing oil seed extracts which are recovered from an extractor and generally are subjected to distillation in a main evaporator having a first condenser and a second or after evaporator having another condenser.

BACKGROUND OF THE INVENTION

For the extraction of vegetable oils from natural starting materials, apparatus has been provided in the past for the mechanical pressing of the oil from the raw substances. Processes are also known which involve solvent extraction where the vegetable matter is macerated in a solvent. One advantage of a solvent extraction process is that high oil yields are obtainable and denaturing of any protein in the product can largely be avoided. The invention is concerned with such extraction processes.

In conventional extraction apparatus for the purposes described, solids in the product withdrawn from the extractor and the oil to be recovered can form an intermediate product, i.e. a so-called miscella phase which must be specially treated to remove the solvent therefrom so that as little residue as possible remains in the end product of the solvent extraction.

Conventional apparatus for this purpose have unusually complex constructions, and require a number of individual components and numerous connecting ducts. In practice, moreover, these ducts can have numerous flanges for joining them together and to the other pieces of the apparatus. Because of the complexity, the cost for assembling the apparatus is excessive and because of the large number of pipe connections and the like, significant solvent losses cannot be prevented.

OBJECTS OF THE INVENTION

It is, therefore, the principal object of the present invention to provide an apparatus of the type described at the outset which can satisfy the most stringent requirements as to the final raw oil product and yet will have a compact construction with a significantly reduced number of ducts, pipes and, particularly, pipe connections.

It is another object of the invention to provide a simplified apparatus for extracting raw oil from a solvent containing oil-seed extract product recovered from a solid extraction unit.

Still another object of this invention is to provide an improved apparatus for distilling solvent from a solvent-containing oil-seed extract, whereby drawbacks of earlier systems are obviated.

SUMMARY OF THE INVENTION

These objects and others which will become apparent hereinafter are attained, in accordance with the invention, by providing the apparatus basically of two modules which are connected in series and in which the elements or components thereof form complete single units each connectable as such with the other unit, thereby minimizing the number of connections and number of ducts or pipes. The primarily module, can comprise, in addition to the vapor washer the main evaporator and a first condenser, a vapor contactor which is preferably identical to or forms part of the vapor washer, and a residual vapor condenser. The vapor washer thus serves the double function of scrubbing the vapor and contacting the vapor with liquids, e.g. the condensates formed in the condenser. The secondary module includes, in addition to the after evaporator and the second condenser a stripping column. The primary module and the secondary modules, in terms of the intermediate product recovered from the extractor, are connected in series.

More particularly, the apparatus distillation of a solvent-containing oil-seed extract can comprise:

a primary module comprising in a single apparatus unit:
  a vapor scrubber forming a vapor contactor,
  a main evaporator fed with the solvent-containing oil-seed extract heated by vapor scrubbed in the vapor scrubber producing a miscella phase and a vapor phase, and
  a first condenser receiving the vapor phase evaporated from the solvent-containing oil-seed extract and forming a condensate;
a secondary module connected in series with the primary module and comprising in a single apparatus unit:
  an after-evaporator receiving the miscella phase, evaporating solvent vapor therefrom and producing a raw oil,
  a stripping column eliminating residual solvent from the oil,
  a second condenser connected to the stripping column for producing another condensate containing solvent evaporated from the miscella phase; and
means for supplying the condensates to the contactor for contacting residual vapor in the primary module therewith.

Because a number of components each are joined into a primary module and a secondary module, a large number of the ducts and conveying units such as pumps and pipe connections can be eliminated. The assembly of components into the modules also allows a significant reduction in the heat radiating surfaces.

Because of the joining of the after evaporator and the stripping column, for example, the heat radiation from the after evaporator can be used to raise the temperature of the medium within the stripping column so that operating costs can be reduced. The compact construction is of significantly reduced volume since the main evaporator is joined to the combined vapor washer/vapor contactor. The combination of the first condenser with the main evaporator also eliminates connecting ducts and filling which would otherwise be required.

A displacement of the miscella phase through the apparatus can be ensured by connecting the main evaporator with a miscella pump.

For coupling the primary module with the secondary module according to the invention between the primary module and the secondary module, a miscella preheater is provided.

When the vapor condenser of the secondary module is provided with a condenser for residual vapor, the system can be made more compact.

Undesired heat loss by radiation can be prevented by providing the after evaporator and the stripping column so that they are coaxial, the first being preferably located on the second. For better results with respect to solvent recovery the second condenser should directly form a wall to the stripping column.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
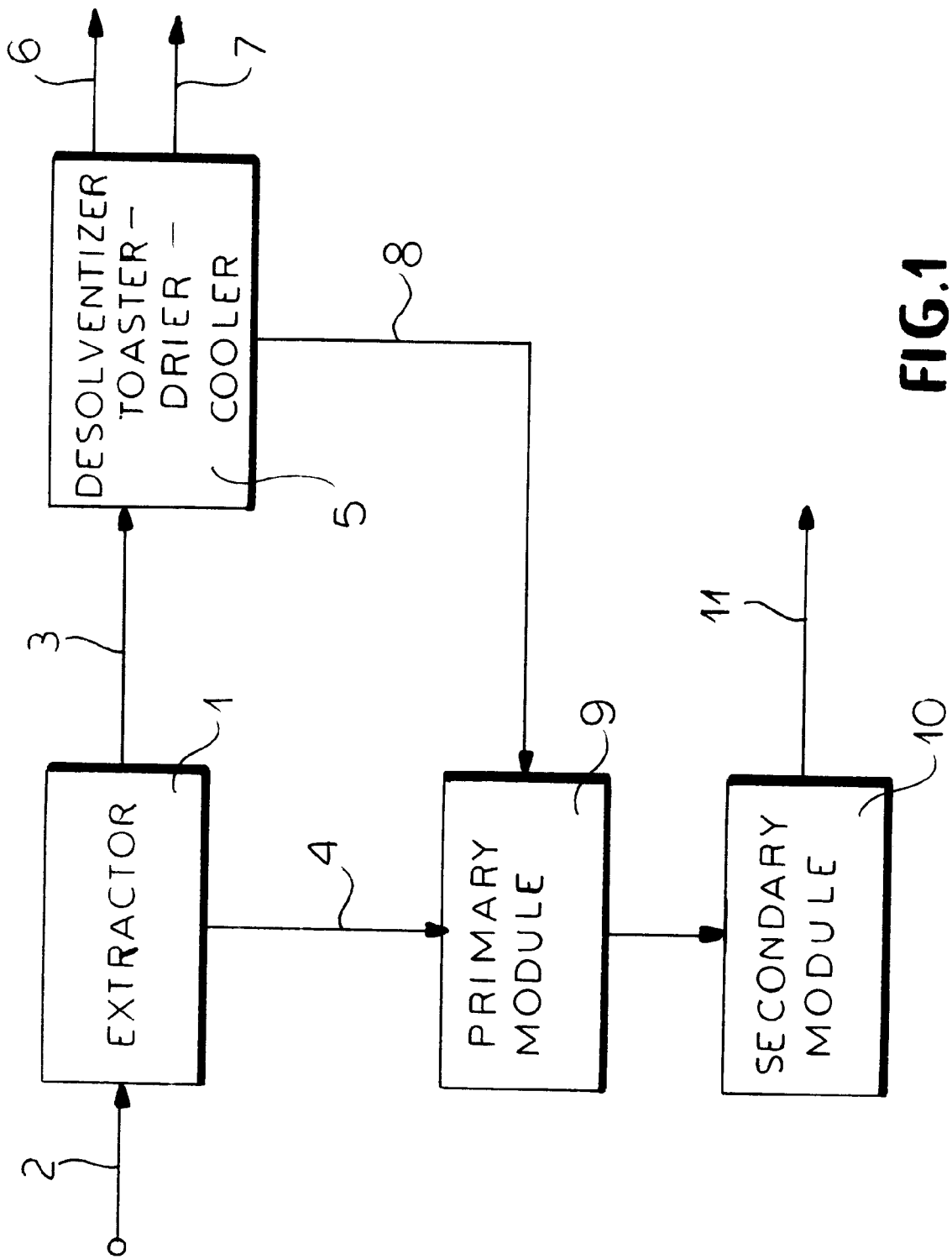
FIG. 1 is a highly diagrammatic block flow diagram of the apparatus of the invention.

The block diagram of FIG. 1 shows the overall construction of a system according to the invention. Here the extractor is represented at 1 and is filled at 2 with the starting material, namely, a mixture of the solvent and the oil-seed solids to be extracted. The extractor 1 has a solids outlet 3 and an intermediate product outlet 4. The intermediate product represents the liquid phase, namely, the miscella-containing solvent mixture. The intermediate product 4 thus includes the oil to be recovered in addition to entrained solids.

Figure 2:
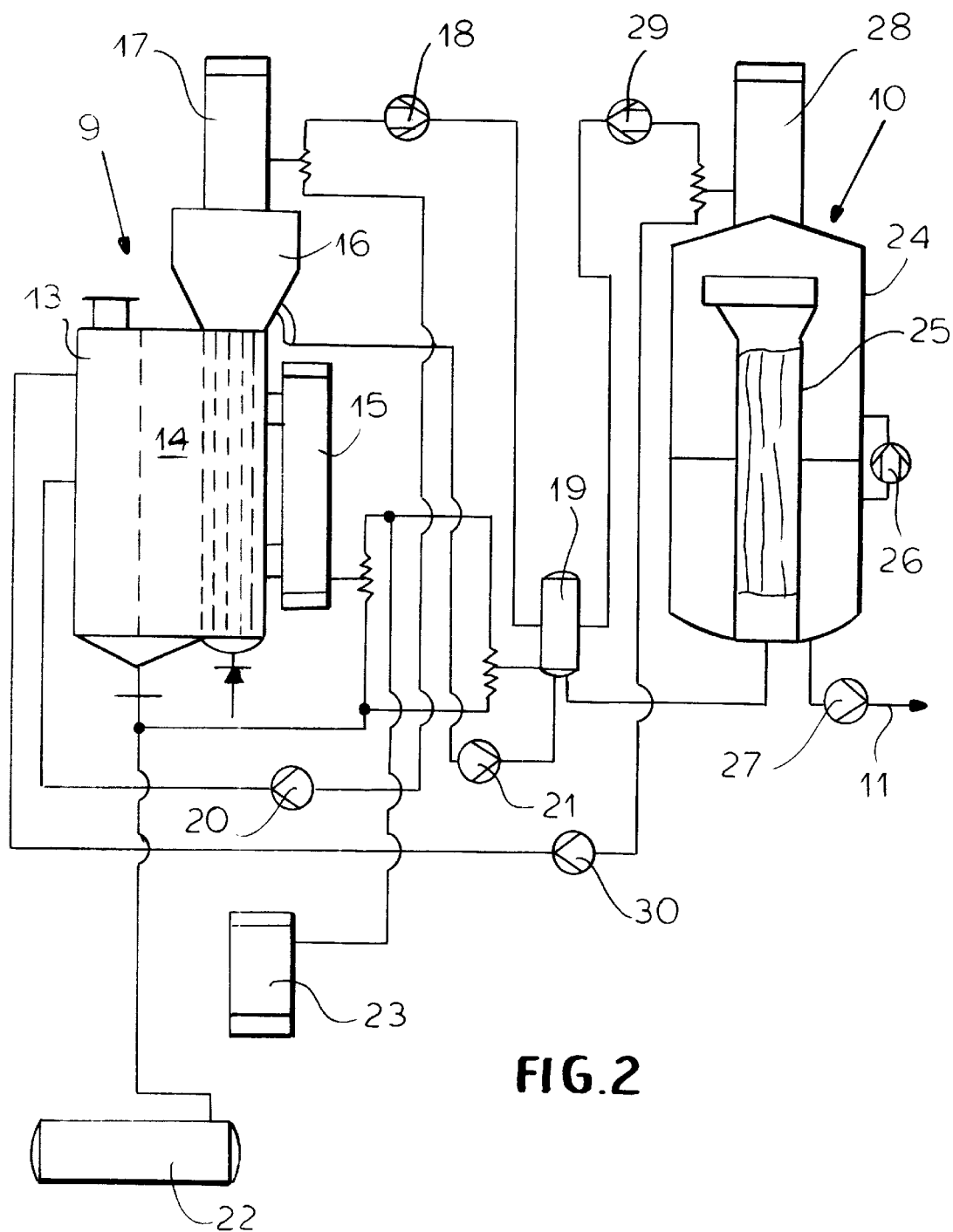
FIG. 2 is a detail elevation of the apparatus structurally illustrating the primary and secondary modules.

The solids outlet 3 is connected to a desolventizer-toaster-dryer-cooler represented at 5 which outputs waste gas or air at 6 and a solid residual at 7. Via an outlet 8 from the unit 5, vapors, mostly of the solvent, are led to the primary module 9 to which the oil/solvent phase is fed at 4. The primary module is followed by the secondary module 20 from which the raw oil is discharged at 11. The apparatus shown in FIG. 2 has the primary and secondary modules connected in series and is made up predominantly by these modules.

More particularly, the primary module 9 comprises a combined vapor scrubber 13 and vapor contactor 14 with a condenser 15 for the vapor contactor 14. The primary module 9 also comprises the main evaporator 16 as well as a first condenser 17. The condenser 15 is connected via a vacuum ejector with a miscella-phase preheater 19 and, via the condensate pump 20 with the vapor scrubber 13.

The main evaporator 16 is connected by a miscella-phase pump 21 to the miscella phase preheater 19.

Both the vapor scrubber 13 with the vapor contactor 14 and the condenser 15 are connected to a solvent-water-solids separator 22 while the waste air from the system can be cooled at 23.

The secondary module 10 comprises a stripping column 24 coaxially surrounding an after evaporator 25 and the latter is located within the stripping column 24.

The secondary module 10 also has a jet pump 26 for displacing the liquid in the stripping column into the vapor space and a crude oil pump 27 for discharging the product 11 as shown.

The after evaporator 25 receiving the miscella phase from the miscella phase preheater 19 and the stripping column 24 is connected directly to a second condenser 28 which can be tied to the miscella phase preheater 19 via a stripping condenser 29. There is a further connection between the second condenser 28 via the stripper condensate pump 30, and the vapor scrubber 13 for further treatment of the vapor.

The primary and secondary modules are thus connected in series and subject the miscella phase leaving the extractor, usually after cleaning, to preconcentration in the primary module 9 with removal of the residues of solvent in the secondary module 10. The use of the vapor phase in module 9, after the vapor has been washed with water and/or hexane allows the heat transfer to the miscella to be concentrated. The vapor contactor 14 allows any residual heat of the vapor to heat up the condensate from one or both of the condensers 15 and 17 with remaining heat being pulled off by condenser 15. In the concentration of the oil from the miscella, solvent vapor is generated and condensed by the first condenser 17.

After preheating, the miscella phase then enters the after evaporator 25 and this phase is further concentrated in the raw oil with the aid of steam. Possible traces of solvent which may remain are removed in the stripping column 24 and the solvent vapor is then condensed in the second condenser 28. The condensates are then fed back to the vapor contactor 14 in which the previously described steps in the solvent separation are carried out. Because of the compact arrangement of the apparatus elements there is a minimized danger of leakage of solvent vapor and environment hazardous leakage or releases of solvent/air mixtures into the atmosphere.

I claim:

1. An apparatus for distillation of a solvent-containing oil-seed extract said apparatus comprising:
   a primary module comprising in a single apparatus unit:
      a vapor scrubber forming a vapor contactor,
      a main evaporator fed with said solvent-containing oil-seed extract heated by vapor scrubbed in said vapor scrubber producing a miscella phase and a vapor phase, and
      a first condenser receiving the vapor phase evaporated from said solvent-containing oil-seed extract and forming a condensate;
   a secondary module connected in series with said primary module and comprising in a single apparatus unit:
      an after-evaporator receiving said miscella phase, evaporating solvent vapor therefrom and producing a raw oil,
      a stripping column eliminating residual solvent from said oil,
      a second condenser connected to said stripping column for producing another condensate containing solvent evaporated from said miscella phase; and
   means for supplying said condensates to said contactor for contacting residual vapor in said primary module therewith.

2. The apparatus according to claim 1 wherein the main evaporator is connected to and bounded by a combination of the vapor scrubber and vapor contactor.

3. The apparatus according to claim 1 wherein the first condenser is connected directly to and bounds the main evaporator.

4. The apparatus defined in claim 1 further comprising a miscella phase pump connected to the main evaporator.

5. The apparatus defined in claim 1 wherein, between said primary module and said secondary module a miscella preheater is provided.

6. The apparatus defined in claim 1 wherein a residual vapor condenser is provided directly adjacent and bounded said vapor contactor.

7. The apparatus defined in claim 1 wherein the after evaporator and stripping column are coaxial with one anther and located one inside the other.

8. The apparatus defined in claim 7 wherein said after evaporator is disposed within the stripping column.

9. The apparatus defined in claim 1 wherein said second condenser is connected directly to and is disposed directly adjacent the stripping column.

* * * * *